July 2, 1968

B. R. PELLY 3,391,327

DUAL BRIDGE CONVERTER CIRCUITRY

Filed May 4, 1966

United States Patent Office 3,391,327
Patented July 2, 1968

3,391,327
DUAL BRIDGE CONVERTER CIRCUITRY
Brian R. Pelly, Murrysville, Pa., assignor to Westinghouse Electric Corporation, Pittsburgh, Pa., a corporation of Pennsylvania
Filed May 4, 1966, Ser. No. 547,545
16 Claims. (Cl. 321—27)

ABSTRACT OF THE DISCLOSURE

There is disclosed a dual converter system for supplying variable reversible direct current and voltage to a load. The system has two full wave bridge type converters for interchanging power between alternating and direct current circuits. The direct current terminals of the converters are connected in parallel opposition across a load through an inductive reactance network that includes two center-tapped winding circuits coupled by magnetic core means. One end of each winding circuit is connected to a different one of the direct current terminals of one converter, while the opposite end of each winding circuit is connected to a different one of the direct current terminals of the other converter, the arrangement being such that the direct current terminals connected to opposite ends of each winding circuit are of like voltage polarity but of unlike current polarity. The load is connected between the center taps of the winding circuits. The core means includes two flux path arrangements which cooperate with the winding circuits to provide two reactor arrangements, one presenting a high impedance to first components of ripple voltage between the converters, and the other presenting a high impedance to second components of ripple voltage appearing between the converters.

---

This invention relates to electrical systems wherein power is interchanged between alternating and direct current circuits, and more particularly to dual converter circuitry adapted to convert alternating current power into a reversible direct current output.

As is known, the usual dual bridge converter circuit is made up of two full-wave bridge rectifiers or converters connected back-to-back in parallel opposition such that the magnitude and polarity of an output voltage applied to a load is dependent upon the phase of the firing signals applied to the two converters. The individual rectifier elements in the respective converters are of the controlled type (i.e., thyratrons or solid-state thyristors) such that the periods of conduction of the rectifier elements in the two converters can be individually controlled by phase commutation techniques. That is, by controlling the firing angle of the rectifier elements in the two parallel converters, the output of the dual converter can be varied in magnitude and/or polarity. Such converters are used, for example, in speed control of direct current machines, for providing a variable reversible direct current armature voltage, and for speed control of alternating current machines, by providing a variable low frequency alternating current output.

There are two commonly used techniques for controlling the firing pulses applied to the two converters. In the first of these, firing pulses are applied to the controlled rectifiers in only one of the two converters such that all of the load current is supplied by only that one converter, the other converter being "blocked." In the other mode of operation, firing pulses are applied to the controlled rectifiers in both converters, without regard to the direction of the load current, and the converter firing angles are adjusted so that their mean output terminal voltages are the same. There is, therefore, no mean voltage difference between their outputs. However, alternating current ripple voltages do appear between the converters, the magnitudes of which depend upon the firing angle; and it is necessary to connect some inductive impedance between the two converters to support these ripple voltages. In the past, this inductive impedance has usually taken the form of four separate and independent inductors, each of which is connected between a load terminal and an output terminal of one of the two converters. While this method for limiting pulsating circulating currents between the converters is workable, it requires the use of four relatively large and expensive inductors. This is primarily due to the fact that the current flow and flux excursion in such inductors is unidirectional, meaning that only one half of the hysteresis loop of the core material is utilized.

As an overall object, the present invention provides a dual converter arrangement in which the size of the circulating current-limiting inductors is materially reduced to about one half the size of those employed in a prior art circuit of this type. This, of course, provides significant weight and cost reductions.

Another object of the invention is to provide a circulating current-limiting inductor arrangement for a dual bridge converter wherein considerably less reactive impedance is presented to the load current. As will be understood, this may sometimes give improved performance characteristics, particularly when the dual converter is utilized to provide a low frequency alternating current output.

In accordance with the invention, there is provided first converter means for rectifying an alternating current voltage and having a pair of output terminals, second converter means for rectifying an alternating current voltage and having a pair of output terminals, first inductive means connecting one output terminals of the first converter means to one output terminal of the second converter means, second inductive means connecting the other output terminal of the first converter means to the other output terminal of the second converter means, core means inductively coupling the first and second inductive means, and an electrical load having a first terminal connected to the first inductive means intermediate its ends and a second terminal connected to the second inductive means intermediate its ends.

The first and second converter means are of the full-wave bridge type employing semiconductive controlled rectifiers, while the first and second inductive means are divided into two portions. The first of such portions produces a high impedance to one component of the ripple voltage, while the other portion presents a high impedance to the remaining component. Thus, the ripple voltage is effectively divided into two components by virtue of the inductive coupling between the aforesaid first and second inductive means. As will be seen, this permits a bidirectional flux excursion in one of the portions of the inductive means and results in a material reduction in required core volume.

The above noted objects and features of the invention will become apparent from the following detailed description taken in connection with the accompanying drawings which form a part of this specification and in which.

Figure 1:
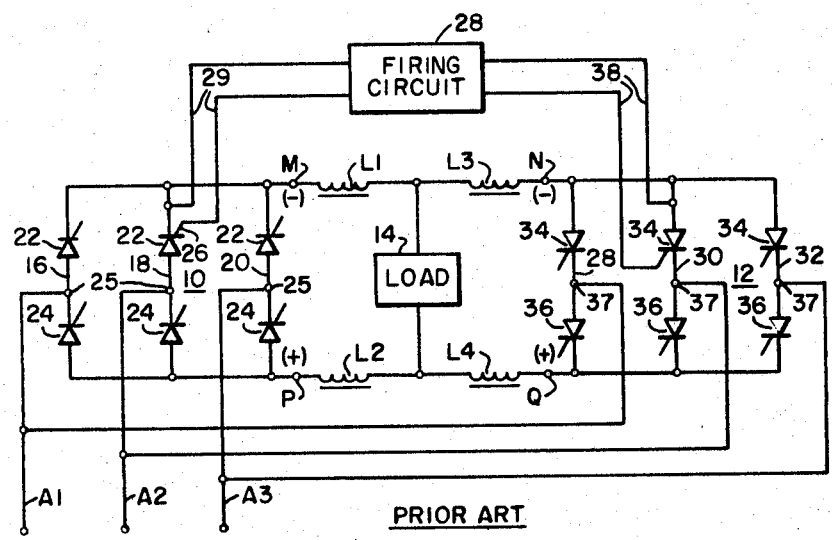
FIGURE 1 is an illustration of a conventional prior art dual converter included herein for purposes of explanation.

With reference now to the drawings, and particularly to FIG. 1, three-phase alternating current power from a suitble source, not shown, is applied to two full wave bridge type converter circuits 10 and 12 through leads A1, A2 and A3. The converter 10, for example, has direct current output terminals P and M and will produce a rectifier output voltage with the polarity indicated (i.e., terminal P positive with respect to terminal M). Similarly, the converter 12 is provided with direct current output terminals Q and N, the output voltage produced by converter 12 being such that terminal Q is positive with respect to terminal N. The terminals M and P are connected to a load 14 through current-limiting inductors L1 and L2; whereas the terminals N and Q are connected to this same load through current-limiting inductors L3 and L4. It can be seen, therefore, that the two converters 10 and 12 are connected back-to-back in parallel opposition such that the magnitude and polarity of the voltage applied to the load 14 will be dependent upon the outputs of the two converters. For sake of clarity, the terminals P and Q will hereinafter be referred to in the specification and claims as "positive terminals" while terminals M and N will be referred to as "negative terminals." As will be understood, these polarities may be reversed, depending upon the manner in which the thyristors in the two converters are fired. Thus, terminals P and Q will always be of like voltage polarity, either positive or negative. Likewise, terminals M and N will always be of like voltage polarity opposite to the voltage polarity of terminals P and Q. However since the converters 10 and 12 are connected in parallel opposition across the load 14, terminals P and Q will always be of unlike current polarity. Terminals M and N also are of unlike current polarity.

With reference to the converter 10, for example, it includes three parallel branches 16, 18 and 20 connected between the output terminals P and M. Each of the branches, in turn, includes two thyristors 22 and 24 connected in series such that the cathode of the thyristor 22 is connected to the terminal M while the anode of thyristor 24 is connected to terminal P. The junctions 25 are the alternating current terminals of the bridge 10 and are coupled to the supply terminals A1, A2 and A3. The thyristors 22 and 24, comprising semiconductive controlled rectifiers, operate in a manner similar to a thyratron. That is, current through the device can be initiated by means of a bias potential applied to a gate electrode separate and apart from the main power electrodes for the device. They are used, for example, in phase controlled systems wherein the rectifiers are at cut off at the beginning of a cycle of an alternating current source, but are gated on after a predetermined time delay in the cycle whereby the rectifier will deliver to the load only a selected part of the available power. With reference to rectifier 22, for example, the gate electrode is identified by the numeral 26; and this gate electrode is connected, along with the cathode of rectifier 22, to a firing circuit 28 through leads 29. While only the rectifier 22 is shown herein as being connected to the firing circuit 28, it will be appreciated that each of the rectifiers in the converter 10 are similarly connected to circuit 28 such that they may be gated on at the proper firing angle during a half cycle of an alternating current voltage.

Similarly, the converter 12 includes three branches 28, 30 and 32, each including two thyristors 34 and 36 connected in series with a junction 37 therebetween, such that the anode of thyristor 34 is connected to the positive output terminal N, while the cathode of thyristor 36 is connected to the negative output terminal Q. The junctions 37 are the alternating current input terminals of bridge 12 and are coupled to the supply terminals A1, A2 and A3. As was the case with converter 10, the control electrode and cathode of thyristor 34 are connected to the firing circuit 28 through leads 38; and it will be appreciated that each of the other thyristors in the converter 12 are similarly connected to the firing circuit 28.

In the operation of the dual converter circuit, the thyristors in converter 10 are gated on during one half cycle of the applied alternating current power, while those in converter 12 are gated on during the other half cycle to produce the polarity indicated at terminals M, P and N, Q. In one mode of operation of the dual converter of FIG. 1, firing pulses are applied by the circuit 28 to the thyristors in only a single converter 10 or 12, while the other converter is inactive or "blocked." Assuming, for example, that firing pulses are applied only to the converter 12, the output voltage betwen terminals Q and N having the polarity indicated would be dependent upon the time during a cycle of the alternating current power applied thereto at which the thyristors are gated on. Thus, if the thyristors are gated on after the major portion of an alternating current half cycle has elapsed, relatively little power will be delivered at the terminals Q and N. This power can, of course, be increased by causing the thyristors 34 and 36 to fire earlier during the half cycle.

The other mode of operation of the converter FIG. 1, and the one with which the present invention is concerned, involves the application of firing pulses to both converters 10 and 12. In this mode of operation, the converter firing angles α are adjusted such that their mean output terminal voltages are the same, the thyristors in converter 10 being caused to fire during one half cycle of the applied three phase power; while the thyristors in converter 12 are caused to fire on the other half cycle. The arrangement is such that for zero load voltage both converters are fired at the base angle X, that is, at 90° in retard of the angle Y, the angle Y being that angle which for each converter gives maximum positive voltage. From the above it is seen that $\angle X = \angle Y + 90°$. To drive the load in one direction, the firing angles α of the respective converters are changed from that "90° base" by the same angle but in opposite directions so that one is retarded while the other is advanced, and vice versa for reversal of the load. Thus the converter whose firing angle α is advanced from the base angle X, provides rectification with positive voltage at its D.C. terminals, while the converter whose firing angle α is retarded from the base angle X povides negative voltage at its D.C. terminals and therefore power inversion. See "Principles of Inverting Circuits" (pages 62–67 and 73–80), by Bedford Hoft, published by John Wiley & Sons, Inc., and "Silicon Controlled Rectifier Designers Handbook" (section 7.1.2 pages (7–2), (7–3), (7–4) and (7–5)), published by Westinghouse Electric Corporation, for a general discussion of the effects of phase control on full wave bridge type converter circuits. The magnitude and polarity of the voltage applied to the load 14 during this mode of operation will, of course, be dependent upon the magnitudes of the voltages generated between terminals P, M and Q, N. During this mode of operation, there is no mean voltage difference between the outputs of the two converters 10 and 12; however alternating current ripple voltages do appear between points P and Q and M and N.

Figure 3A:
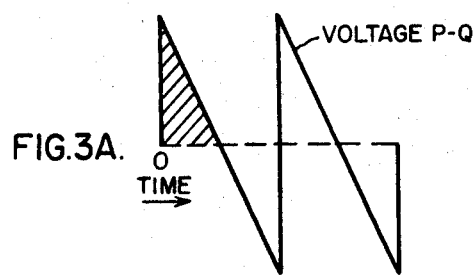
FIGS. 3A and 3B illustrate the ripple voltage wave forms appearing between the output terminals of the converters of FIGS. 1 and 2.
Figure 3B:
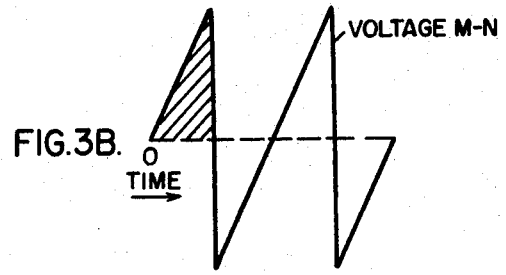

The maximum ripple voltages appearing between these points occur when the firing angles are set for half maximum output voltage, and half the wave shapes shown in FIGS. 3A and 3B. In order to support these ripple voltages and limit the pulsating circulating current between the converters, the inductors identified as L1, L2, L3 and L4 in FIG. 1 are provided in a conventional prior art circuit. The size of the inductors required to support these voltages, when connected as shown in FIG. 1, is appreciable. Commonly, the inductors which carry the load current are allowed to saturate, meaning that the unsaturated inductors on the other side of the circuit support the whole of the alternating current ripple voltage between the converters. Assuming, for example, that converter 10 supplies the load current, inductors L1 and L2 in FIG. 1 will be saturated. Therefore, inductors L3 and L4 each have to support the shaded volt-second areas shown in the wave forms of FIG. 3. Consequently, the toal core volume for the four inductors L1–L4 for the circuit in FIG. 1 is proportional to four times the shaded area of either one of the wave forms of FIG. 3 since there are four similar inductors. Note that the flux excursion in all four inductors L1–L4 is unidirectional for the reason that current flows through the thyristors in each converter in only one direction. Thus, only one half of the hysteresis loop of the core material in these inductors is utilized. This, of course, adds to the weight and cost of the inductors.

Figure 2:
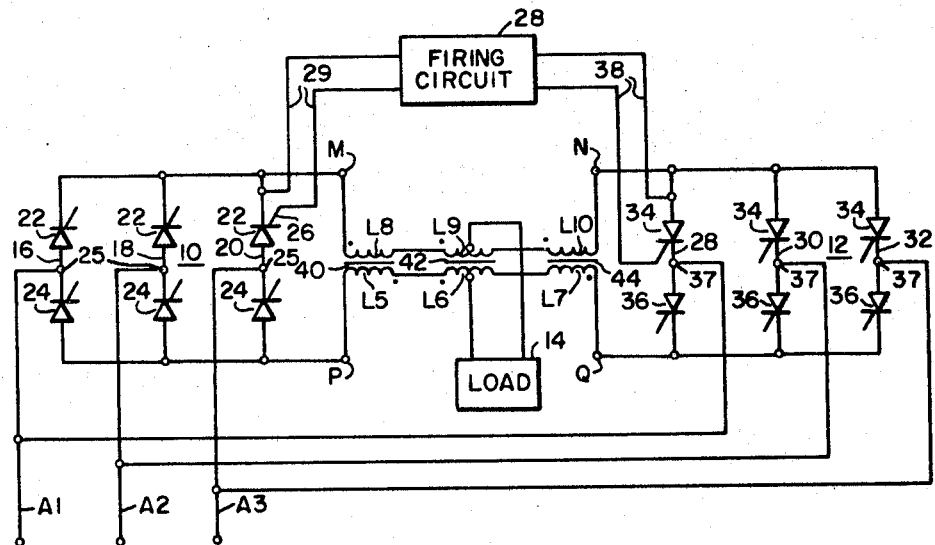
FIG. 2 is an illustration of the improved circuitry of the invention.

The improved circuitry of the present invention is shown in FIG. 2 where elements corresponding to those in FIG. 1 are identified by like reference numerals. It again includes the two converters 10 and 12 supplied with three phase power from leads A1–A3 and controlled by a firing circuit 28. That is, the converters 10 and 12 are identical to those previously described in connection with FIG. 1 and are provided, respectively, with output teminals P, M and Q, N. In this case, however, the output terminals P and Q are interconnected by three series-connected inductors L5, L6 and L7. Similarly, the terminals M and N are interconnected by three inductors L8, L9 and L10.

Among other things, the circuit of FIG. 2 differs from that of FIG. 1 in that the inductor L5 is inductively coupled to inductor L8 by means of a suitable core 40; inductor L6 is inductively coupled to inductor L9 through core 42; and inductor L7 is inductively coupled to inductor L10 by means of core 44. Furthermore, the terminals of load 14 are connected to the midpoints of inductors L6 and L9. Inductor L5 is wound with respect to inductor L8 such that a voltage of one polarity induced in inductor L5 will produce a voltage of the opposite polarity across inductor L8. That is, points of like polarity are indicated by the dots. Thus, it is not possible for the inductors L5 and L8 to support voltages of the same polarity applied to their windings. The same is true of inductors L7 and L10. Inductors L6 and L9, however, are wound such that they will not support voltages of opposite polarity applied across their windings.

Figure 4A:
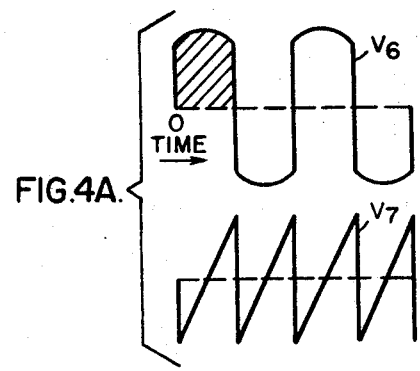
FIGS. 4A and 4B illustrate voltage wave forms comprising components of ripple voltage appearing across various ones of the current-limiting inductors shown in FIG. 2.
Figure 4B:
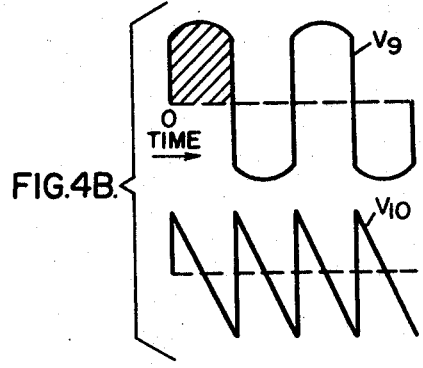

The present invention, in effect, resides in the discovery that the ripple voltage between the terminals P–Q can be divided into the components $V_6$ and $V_7$ shown in FIG. 4A and similarly, the ripple voltage between M–N can be divided into the components $V_9$ and $V_{10}$ shown in FIG. 4B. Reverting again to the circuit of FIG. 2 and assuming that the inductors which carry the load current are allowed to saturate, the unsaturated inductors must support the whole of the alternating current ripple voltage between the converters. Thus, assuming that converter 10 supplies the load current, inductors L5 and L8, along with core 40, will be saturated. The ripple voltage M–N of FIG. 3B, therefore, must be divided between inductors L9 and L10. The components of ripple voltages P–Q and M–N which have a frequency equal to three times the line frequency (i.e. $V_6$ and $V_9$ in FIGS. 4A and 4B) are in phase with one another. Inductors L6 and L9, therefore, present a high impedance to these components of voltage; while inductors L7 and L10 present virtually no impedance to $V_6$ and $V_9$. As was explained above, this is due to the fact that the windings L9 and L6 present a high impedance to voltages of like polarity; whereas voltages of like polarity applied to inductors L10 and L7 will produce no net flux in the core 44.

Inductors L7 and L10, on the other hand, present a high impedance to components $V_7$ and $V_{10}$ shown in FIGS. 4A and 4B. Furthermore, since the flow of magnetizing current through the inductors L9 and L6 is bidirectional, the flow of flux in the core 42 is also bidirectional. In the circuit of FIG. 2, one complete winding L6 or L9 has to support the shaded volt-second area shown in wave form $V_6$ or $V_9$ of FIGS. 4A and 4B. This area is, in fact, the same as the shaded areas of FIGS. 3A and 3B for the wave forms P–Q and M–N; but the flux excursions due to the voltages $V_6$ and $V_9$ are now symmetrical about zero. Therefore, the effective volt-second area of wave form $V_6$ or $V_9$, for purposes of determining the required relative component volt-ampere rating, is about one half that for the wave forms P–Q and M–N. Thus, the total relative volt-ampere rating for the two windings or inductors L9 and L6 is proportional to one times the shaded area of any one of the waveforms P–Q, M–N, $V_6$ or $V_9$.

Figure 5:
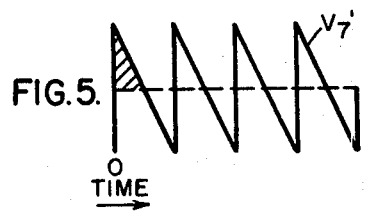
FIG. 5 illustrates a component of ripple voltage appearing across one of the current-limiting inductors when the mean output voltage of the dual converter is zero.

Considering, now, the inductors L10 and L7, the maximum voltage appears across these inductors when the means output voltage is zero. The voltage wave form for inductor L7 under this condition is shown in FIG. 5 and identified as $V_7'$. The voltsecond area shown shaded is one-fourth that of wave form P–Q or wave form M–N. Since the flux excursion in the core 44 is unidirectional, the total required relative volt-ampere rating for inductors L10 and L7 is proportional to one half the shaded area of wave form P–Q (i.e. the shaded area of wave form $V_7'$). The total combined relative volt-ampere rating for the three inductors of FIG. 2 is, therefore, proportional to two times the shaded area of wave form P–Q or wave form M–N. Comparing this result with that obtained for the conventional arrangement of FIG. 1, it will be seen that the required overall volt-ampere rating of the inductors has been halved.

Although the invention has been shown in connection with a certain specific embodiment, it will be readily apparent to those skilled in the art that various changes in form and arrangement of parts may be made to suit requirements without departing from the spirit and scope of the invention. In this respect, it will be appreciated that whereas inductors L8, L5 and L10, L7 are shown as two separate components, it would be possible to combine these two inductors into one component, with four mutually coupled isolated windings.

I claim as my invention:

1. In a dual converter circuit arrangement for producing a variable reversible direct current and voltage with respect to a load, the combination of first and second full wave bridge type converter means for interchanging power between alternating current and direct current circuits, each of said converter means having first and second direct current terminals of unlike voltage polarity and unlike current polarity, said first direct current terminal of the first converter means and said first direct current terminal of the second converter means being of like voltage polarity but of unlike current polarity, first inductive means connecting said first direct current terminal of said first converter means to said first direct current terminal of the second converter means, second inductive means connecting said second direct current terminal of the first converter means to said second direct current terminal of the second converter means, core means inductively coupling said first and second inductive means, and an electrical load having a first terminal connected to the first inductive means intermediate its ends and a second terminal connected to the second inductive means intermediate its ends.

2. The circuit arrangement of claim 1 wherein the terminals for said load are connected to the respective first and second inductive means midway between their ends.

3. The circuit arrangement of claim 1 wherein each converter means comprises a plurality of parallel branches connected between its direct current terminals, each branch including a pair of controlled rectifier devices in series, the anode of one controlled rectifier device being connected to the cathode of the other, means for applying an alternating current potential between the junction of the rectifier devices in one branch and the junction of the rectifier devices in another of the branches, control electrodes for each of the rectifier devices, and means connected to said control electrodes for controlling the period of conduction of the rectifier devices during a half cycle of an alternating current voltage source.

4. The circuit arrangement of claim 3 wherein each converter means comprises a three-phase full wave bridge rectifier.

5. The circuit arrangement of claim 1 wherein the first and second inductive means each include first portions which produce flux in said core means when current is drawn by said load, said first portions presenting a high impedance to a first component of ripple voltage appearing between the first and second converter means, said first and second inductive means also including second portions which produce no net flux in the core means when current is drawn by said load, said second portions presenting a high impedance to a second component of ripple voltage appearing between the first and second converter means.

6. The circuit arrangement of claim 1 wherein the first and second inductive means each include three windings in series and the core means comprises three separate cores, each core serving to inductively couple a respective winding in one inductive means to an associated winding in the other inductive means.

7. The circuit arrangement of claim 1 wherein the first and second inductive means each include three windings in series and the core means comprises three separate cores, each core serving to inductively couple a respective winding in one inductive means to an associated winding in the other inductive means, the terminals of said electrical load being connected to the respective intermediate windings of each series of three windings, said intermediate windings being inductively coupled to their associated core to produce no net flux in said associated core when current is drawn by said electrical load, and the windings in each series of three windings on either side of said intermediate windings being wound to produce flux in their associated cores when current is drawn by said electrical load.

8. The circuit arrangement of claim 7 wherein the terminals of said electrical load are connected to said respective intermediate windings midway between their ends.

9. The circuit arrangement of claim 7 wherein said intermediate windings produce a high impedance to a first component of ripple voltage appearing between the first and second converter means, the windings on either side of the intermediate windings producing a high impedance to a second component of ripple voltage between the the first and second converter means when not saturated by load current.

10. The circuit arrangement of claim 9 wherein said intermediate windings produce virtually no impedance to said second component of ripple voltage and the remaining windings which are not saturated produce virtually no impedance to said first component of ripple voltage.

11. The circuit arrangement of claim 1 wherein each converter means comprises a plurality of parallel branches connected between its first and second direct current terminals, each branch including a pair of controlled rectifier devices in series with a junction therebetween and with the anode of one controlled rectifier device connected to the cathode of the other, the cathodes of said one rectifier devices of said first converter means being connected to said first direct current terminal of the first converter means, the anodes of said other rectifier devices of said first converter means being connected to said second direct current terminal of the first converter means, the cathodes of said one rectifier devices of said second converter means being connected to said second direct current terminal of the second converter means, the anodes of said other rectifier devices of said second converter means being connected to said first direct current terminal of the second converter means, said junctions of each converter means being alternating current terminals of that converter means.

12. The combination as in claim 11 wherein each of said junctions in the first converter means is connected to a different one of said junctions in the second converter means.

13. The combination of claim 11 wherein said core means includes first and second flux path means, the first flux path means being arranged with said first and second inductive means to provide first reactor means presenting a high impedance to first components of ripple voltage appearing between said first and second converter means, the second flux path means being arranged with said first and second inductive means to provide second reactor means presenting a high impedance to second components of ripple voltage appearing between the first and second converter means.

14. The combination of claim 13 wherein said first components of ripple voltage include concurrently occurring like polarity third and fourth components, the third appearing across said first direct current terminals and the fourth appearing across said second direct current terminals, and said second components of ripple voltage include concurrently occurring unlike polarity fifth and sixth components, the fifth appearing across said first direct current terminals and the sixth appearing across said second direct current terminals.

15. The combination of claim 1 wherein said core means includes first and second flux path means, the first flux path means being arranged with said first and second inductive means to provide first reactor means presenting a high impedance to first components of ripple voltage appearing between said first and second converter means, the second flux path means being arranged with said first and second inductive means to provide second reactor means presenting a high impedance to second components of ripple voltage appearing between the first and second converter means.

16. The combination of claim 15 wherein said first components of ripple voltage include concurrently occurring like polarity third and fourth components, the third appearing across said first direct current terminals and the fourth appearing across said second direct current terminals, and said second components of ripple voltage include concurrently occurring unlike polarity fifth and sixth components, the fifth appearing across said first direct current terminals and the sixth appearing across said second direct current terminals.

References Cited

UNITED STATES PATENTS

| | | | |
|---|---|---|---|
| 3,026,467 | 3/1962 | Barnes | 321—26 XR |
| 3,036,258 | 5/1962 | Friedrich | 321—27 XR |
| 3,308,368 | 3/1967 | Schmidt | 321—27 XR |

FOREIGN PATENTS

| | | |
|---|---|---|
| 1,051,379 | 2/1959 | Germany. |

JOHN F. COUCH, *Primary Examiner.*

W. M. SHOOP, *Assistant Examiner.*